May 1, 1962  H. FAY ET AL  3,032,654
EMISSION SPECTROMETER
Filed Feb. 10, 1958  2 Sheets-Sheet 1
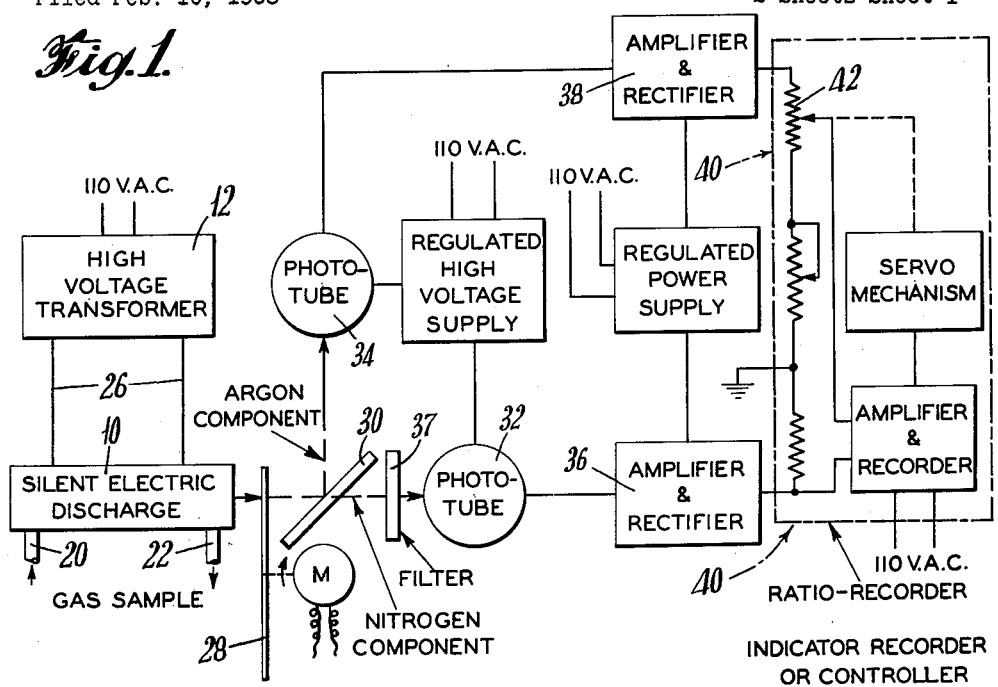
Fig. 1.
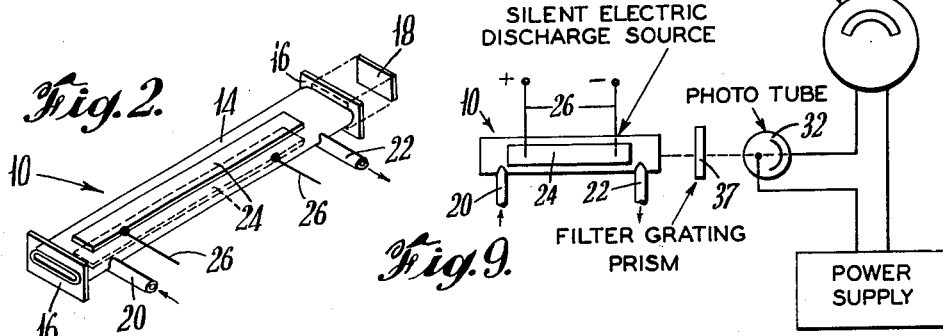
Fig. 2.
Fig. 9.
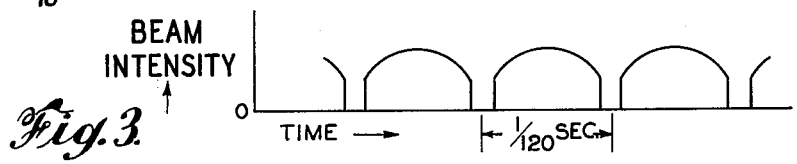
Fig. 3.
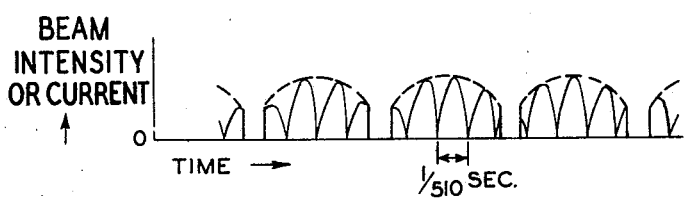
Fig. 4.
INVENTORS
HOMER FAY
PAUL H. MOHR
GERHARD A. COOK
BY William F. Mesinger
ATTORNEY

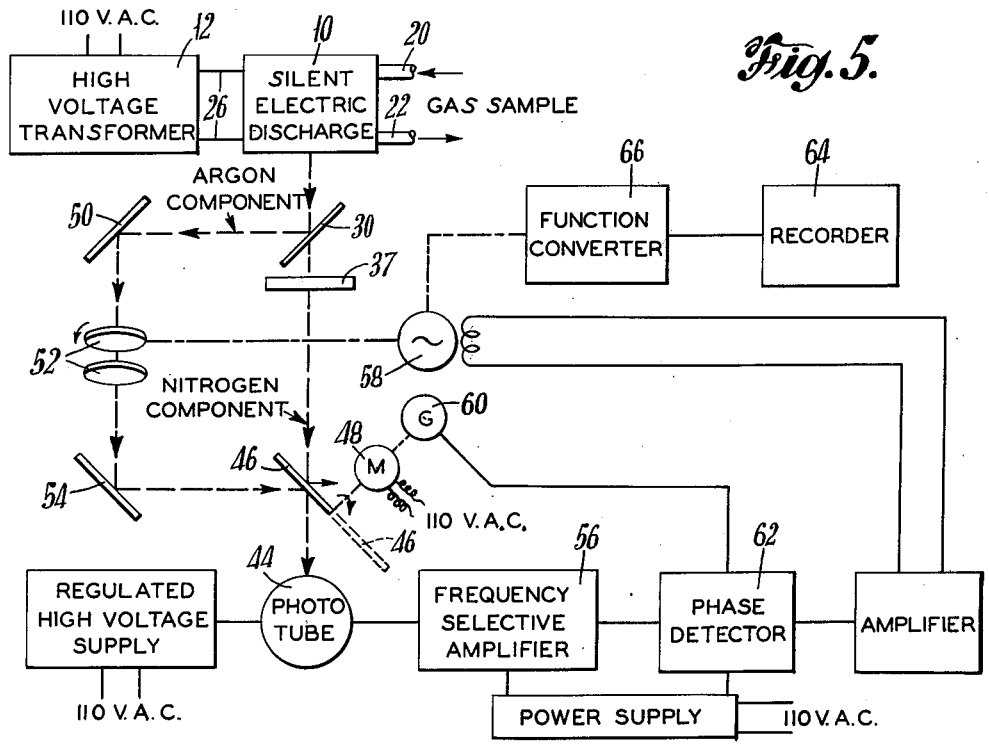
Fig. 5.
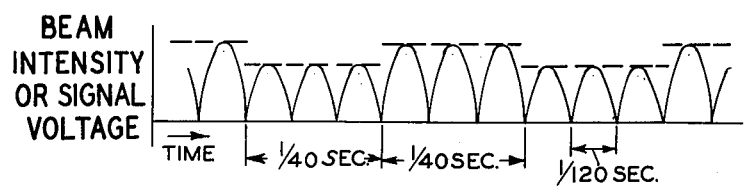
Fig. 6.
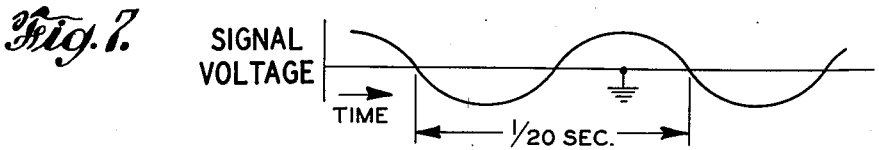
Fig. 7.
Fig. 8.
INVENTORS
HOMER FAY
PAUL H. MOHR
GERHARD A. COOK
BY William F. Mesinger
ATTORNEY 3,032,654
EMISSION SPECTROMETER
Homer Fay, Buffalo, Paul H. Mohr, Kenmore, and Gerhard A. Cook, Clarence, N.Y., assignors to Union Carbide Corporation, a corporation of New York
Filed Feb. 10, 1958, Ser. No. 714,178
14 Claims. (Cl. 250—43.5)

This invention relates to a method and apparatus whereby a quantitative analysis of a continuous flow of a gas of known components may be made. More particularly, it relates to a method and apparatus for comparing the intensity of light emission from excited molecules of the individual gases comprising a mixture such as nitrogen in argon and analyzing and recording the results.

The provision of means for effectively measuring the quantity of one gas in amounts as small as several p.p.m. in mixtures of gases has been the object of extended scientific research. Many devices have been suggested in the past relying upon either physical measurement and/or chemical reactions. These devices, while operative, either lacked sensitivity in the lower ranges, were very slow, or failed to work for certain gas mixtures such as nitrogen in argon.

Slight contamination of argon by nitrogen in the order of a few p.p.m. has been very difficult to analyze by known apparatus. Since both gases are chemically inert with respect to the reagents used in the usual chemical analytical apparatus, chemical methods are not applicable. Fractional distillation for analyzing traces of nitrogen in argon has been successfully employed, wherein the nitrogen is concentrated by a predetermined ratio or factor prior to its detection by thermal conductivity measurements. However, this method is not well suited for production purposes as it is very slow and somewhat tedious. Furthermore, it is not always a convenient method for general analysis of such gases since it requires deep refrigeration to effect concentration by low temperature distillation. A more rapid method requiring no distillation is required.

Gas mixtures of the type mentioned have been successfully analyzed in a mass spectrometer. However, this apparatus is very expensive and complex and requires skilled attendance for reliable operation. It is a delicate laboratory instrument not normally employed as a process monitor or control.

With varying degrees of success, emission spectroscopy has been found to be a method of analyzing certain gas mixtures meeting the requirements outlined above. A number of means for energizing the gas samples to an emissive level were tried including the Geissler tube, Tesla coil, and microwave generator. Argon-nitrogen mixtures were employed in these tests.

Geissler tube excitation of argon-nitrogen mixtures does not produce spectra indicative of nitrogen concentration unless the gas is continuously passed through the discharge tube at a carefully controlled rate. This is because the nitrogen undergoes absorption or reaction a the electrodes and is removed from the mixture at an appreciable rate. The nitrogen radiation intensity is thus dependent on gas flow, and it is not linearly related to concentration. For these reasons, this type of excitation is not considered practical since the electrodes are in direct contact with the gas.

Argon-nitrogen mixtures were sealed in glass tubes at low pressure and were excited by the Tesla coil to emit radiation. Under certain conditions, this radiation was found satisfactory for the detection of traces of nitrogen. However, the nitrogen band intensity was not simply related to the nitrogen concentration. Furthermore, the method required vacuum equipment and presented the problem of dissipating considerable heat which was generated.

Excitation of low pressure mixtures of argon-nitrogen using 10 cm. wavelength microwaves produced nitrogen bands which proved suitable for the analysis of traces of nitrogen in argon. The nitrogen bands were simply related to the concentration, and it was found that a few parts per million nitrogen could be detected with reasonable accuracy. The disadvantage of the microwave analyzer is the expense and bulk of the necessary high-frequency generator and vacuum system. As in the case of the mass spectrometer, the equipment and its operation is very complex and delicate.

In the past, only low-pressure types of discharges have been used as light sources for gas analysis by emission spectroscopy. Thus, all the before-mentioned methods of excitation require partial vacuums, and the resultant radiation is quite intense even in the visible range. Also, the analysis of a sample under vacuum makes continuous testing very difficult and excludes such a system from monitoring a continuous production plant.

As may be seen from the above discussion, any given excitation system may work for a given gas mixture, but when the same excitation is applied to another gas mixture, either no emission may occur, part of the mixture may be absorbed by the apparatus, or no band simply related to the gas concentration may be present in the emitted spectrum. Thus, for each gas system a completely new research program is necessary.

Accordingly, main objects of this invention are to provide a method and instrument which is capable of analyzing a nitrogen-argon gas mixture statically or continuously, accurately, and rapidly.

Further objects of this invention are to provide a method of an apparatus for: analyzing such a gas mixture by measuring the intensity of the characteristic emission bands of one or more of the constituent gases when in an excited state; analyzing spectographically for a component in the gas sample within a range of concentrations such that the intensity of a reference radiation also derived from the gas sample is not significantly affected by variation of the sought component; and utilizing a silent electric discharge as the gas excitation source for the analysis of argon and nitrogen.

Other objects and aims of the invention will become apparent from the following specification and drawings in which:

FIGURE 1 shows a schematic block diagram of the optical and electrical circuits of one embodiment of the emission spectrometer of this invention;

FIGURE 2 is a perspective view showing the structure of the silent electric discharge tube;

FIGURE 3 is a graph showing a wave form of the 120 c.p.s. emission beam from the silent electric discharge tube;

FIGURE 4 is a graph of a wave form of the beam from the "chopper" of the device of FIGURE 1 showing the 510 c.p.s. imposed on the discharge tube beam;

FIGURE 5 shows an optical and electrical block diagram of another and preferred embodiment of the invention;

FIGURE 6 is a graph of a wave form showing the beam and signal characteristics at the phototube of FIGURE 5 when the beams are of unequal intensity;

FIGURE 7 is a graph of a wave form showing the signal characteristics after the frequency-selective amplifier 56 of FIGURE 5;

FIGURE 8 shows a graphical representation of the function of the phase-sensitive detector 62 of FIGURE 5; and FIGURE 9 shows a simplified form of an emission spectrometer embodying the principles of this invention.

According to this invention, a method is provided whereby trace amounts of nitrogen in argon may be determined which comprises the steps of exciting the gas mixture in a silent electric discharge tube at atmospheric pressure or higher, whereby a major radiation band characteristic of each component is emitted, separating the nitrogen radiation component, converting the optical signal to an electrical signal, and operating an indicating instrument with said electrical signal to provide a direct indication of the amount of nitrogen present.

When the method of this invention is applied to mixtures containing not appreciably more than about 1 volume percent of nitrogen gas the ratio of the intensities of the nitrogen emission to either the argon on the total emission is approximately proportional to the nitrogen content of the mixture.

In the silent electric discharge source, a high potential alternating electric field is applied between electrodes located on the outside of a dielectric tube. The sample inside the tube is excited by absorption of energy from the alternating field; i.e., the atoms and molecules of the sample are elevated to higher energy levels and are partially ionized. According to theory, there is a continual transmission of the particles through various degrees of excitation, and radiant energy is emitted when a particle drops from a higher to a lower energy level. The wavelengths of this emission are characteristic of the gas component from which it is derived. Other conditions being held constant, the intensity of the emission from a given component in a gas mixture is often a measure of the concentration of that component in the sample.

Unlike the Geissler tube, the gas sample in the excited state is insulated electrically from the electrodes and terminals which apply the high voltage field. This prevents charged particles from discharging against the electrodes, and hence, current consumption and heat generation are very low. Breakdown of the field by arc or spark discharges through the sample are to be avoided since this consumes considerable power, generates much heat, and may damage the dielectric which insulates the gas from the electrodes.

In the simplest form of the instant invention (as shown in the embodiment of FIGURE 9), the analyzing operation comprises three steps. The sample is first excited to an emissive energy level; next the specific radiation characteristic of the sought component is isolated; and finally, the radiation is converted into an electrical analog, the magnitude of the electrical signal being proportional to the amount of the sought component present in the sample. In the preferred embodiment, a reference radiation is also derived from the sample; and its electrical analog is compared with that of the sought component. The reference is selected to be essentially unaffected by changes in concentration of the sought component. In the case of analyzing for traces of nitrogen in argon, the predominant argon radiation is used as a reference and is compared electrically with the isolated nitrogen radiation. Alternatively, a reference radiation may be obtained by the introduction of a selected component to be employed as an "internal standard." As an example, to the gas sample under test a known concentration of mercury vapor could be added. Mercury furnishes an intense radiation when excited by a silent electrical discharge. Another alternative which has been used very satisfactorily is a comparison of the selected nitrogen radiation with the total radiation from the sample.

In the excitation step, the gas to be analyzed is passed through an excitation chamber wherein the gas molecules and atoms are raised to an emissive energy level, the wavelength of the emission being characteristic of the gas so energized. The emitted beam is then passed from the excitation chamber to an optical system which separates the beam into two components as by means of semi-transparent reflectors and filters. In one embodiment of the invention (FIGURE 1), the two beams are directed to separate photocells, amplifiers, and rectifiers; and the resultant signals are fed into a ratio recording instrument. In another embodiment of the invention (FIGURE 5), both beams are fed into the same photocell and amplifier system. In this latter system a null balance network is employed for greater sensitivity, an optical wedge, filter, etc. being employed to attenuate the major constituent beam for achieving said null balance. In this system, the recorder shows a function of the optical attenuator's motion which is proportional to the contaminant gas concentration.

Referring to FIGURE 1, the gas sample flows continuously through the silent electric discharge tube 10. The sample is at atmospheric pressure and needs no pretreatment. The exciter is powered by 10,000 volts from the transformer 12 which is connected to a 110-volt, 60-cycle source.

The discharge tube 10, FIGURE 2, is a 9½ inch long oblong section glass tube 14 closed at each end with a quartz window 16. A silvered mirror 18 placed over one window reflects and intensifies the radiation leaving the opposite end. Two sample connections 20 and 22 in the side and at opposite ends serve as inlet and outlet for the gas sample, respectively. On each of the outer flat sides of the tube, there is provided a silver plated or platinized and copper plated electrode 24 which extends substantially the full length of the discharge tube and is provided with a suitable electrical lead wire 26. A potential of 10,000 volts A.C. from the transformer is applied across the tube between the electrodes.

Due to the 60-cycle source, the emission from the exciter has the form of a rectified full wave at 120 c.p.s. as shown in FIGURE 3. Since this is a close harmonic of 60 cycles, it is probable that considerable interference would result from 60-cycle distribution systems near the analyzer. The output frequency from the exciter is, therefore, increased by means of a "chopper" 28, which is a disk having 17 apertures and which rotates at 1800 r.p.m. This gives a beam which pulses at 510 c.p.s., although still modulated by the 120 c.p.s. source (FIGURE 4). It should be noted that FIGURES 3 and 4 are smoothed curves illustrating the resultant low frequency wave forms at certain points in the optical circuit. In all probability, the depicted wave form represent modulations of the higher frequency "scrambled" radiation emitted by the excited gas.

The frequency of 510 c.p.s. is quite remote from 60 c.p.s. so that the latter does not cause interference and can be readily "filtered out" later in the circuits. The actual value of the beam frequency is not important; any frequency easily obtained and not affected by other near-by electrical systems may be used.

The "chopper" is only one means of altering the frequency; other means are: (a) motor-generator converters, and (b) electronic converters. With either (a) or (b), the 60-cycle power would be converted before the transformer; and the "light" beam would then leave the exciter with the desired frequency.

The 510 c.p.s. beam is now divided into two beams by the beam splitter 30 which is a glass plate inclined at an angle (e.g., 45°) to the incident beam. A portion of the beam is transmitted through the plate into phototube 32; a portion is reflected into phototube 34; and the remainder is unavoidably absorbed by the plate. The plate should be chosen to absorb a minimum of the radiation, especially within the range of those wavelengths to be isolated and observed. If desired, the plate may be partially coated (e.g., with silver) to exhibit the proper ratio between reflectance and transmission. The proper ratio will depend upon the relative strengths of the sought and reference radiations and upon the characteristics of other optical components in the system; the final object being to introduce resultant beams of the same order of intensity into phototubes 32 and 34. Alternative means of dividing the beam are well-known gratings and prisms.

An optical filter 37 is interposed in the beam to phototube 32 and for argon-nitrogen analysis, has a "peak" transmission efficiency at or about a wavelength of 3371 A. This wavelength obtained from an argon-nitrogen sample emanates entirely from nitrogen, and the beam transmitted through the filter is predominantly of this wavelength. A commercially available optical interference filter is suitable. Similarly, the reflected beam may be filtered to eliminate nitrogen radiation and transmit a beam derived solely from argon. However, the incident beam is already comprised largely of argon emission (about 3100 A.) and is not noticeably affected by variations in nitrogen concentration within this range. The reflected beam is, therefore, reasonably steady without filtering, and is used as the reference beam against which the variable nitrogen radiation is compared.

The inclined plate or beam splitter, together with all required optical filters, make up the "isolation" step in the analyzer. As mentioned previously, these components should preferably be selected so that the resultant beams entering phototubes 32 and 34 are on the same order of intensity.

Phototube 32 receives the nitrogen radiation, and by means of a photosensitive material (e.g., cesium oxide), converts the radiation into an electric current whose strength is proportional to the intensity of the received radiation. Similarly, phototube 34 proportionately converts the argon radiation into an electrical signal. Phototubes 32 and 34 are of a type especially chosen to be highly efficient in converting 3100 A. and 3371 A. wavelengths into an electric signal. The frequency characteristic of the resulting signals is similar to that of the "light" beam after the chopper, consisting of a 510 c.p.s. rectified wave superimposed upon (modulated by) the 120 c.p.s. radiation source (see FIGURE 4).

The signals are now fed into separate amplifier-rectifier circuits (36 and 38). These circuits are "tuned" to the chopper frequency so that in addition to strengthening the signals, they also screen out unwanted frequencies (e.g. 60 cycle and 120 cycle). The "pure" signals are then rectified to reasonably steady D.C. voltages proportional in value to the original beam intensities.

The two D.C. signals enter a ratio-recorder instrument 40, which automatically adjusts a resistance 42 to equalize the potentials of the two signals reaching the recorder. When the two signals become different due to a change in nitrogen concentration, a net current will flow in the recorder causing the equalizing mechanism to readjust the resistance as required to again equalize the potentials. The position of the instrument pen is also adjusted to correspond with the resistance setting, and records parts per million nitrogen directly.

The spectrometer of FIGURE 5 is designed on the optical "null-balance" principle and is intended to provide greater stability and reliability than instrument of FIGURE 1. In this design, the nitrogen and the argon signals are both channeled through a common phototube and amplifier. This avoids errors which may otherwise result due to the unequal performance changes in the components of separate channels. With a single channel, any performance drift in the components will have similar effects on both signals and will cancel out in the final comparison.

Referring to FIGURE 5, the silent electric discharge source 10, transformer 12, beam splitter 30, and filter 37 perform the same function as in the analyzer of FIGURE 1. The 3371 A. nitrogen component from the filter passes to phototube 44 as before. In this beam is interposed a rotating semi-circular disk 46, inclined at an angle (e.g. 45°) to the beam and silvered on that side which is visible from the phototube. Motor 48 rotates the disk at 20 r.p.s., thus intercepting and discarding the nitrogen radiation during one half of each revolution.

The 3100 A. argon component is reflected by mirror 50 through an intensity adjustor or optical attenuator 52. It is again reflected by mirror 54 so that it intercepts the nitrogen radiation at the same point that the nitrogen radiation is cut by the rotating mirror. When the mirror is in position to intercept the nitrogen radiation, it simultaneously reflects the argon beam into the phototube. Thus, a single phototube alternately receives the argon and nitrogen radiations for intervals of $\frac{1}{40}$ sec. each.

FIGURE 6 illustrates the characteristic of the radiation received by the phototube when the argon and nitrogen radiation intensities are unequal. The "flicker" effect produced by the rotating mirror imparts a 20 c.p.s. square wave form to the beam entering the phototube and to the electric signal leaving it. This signal is amplified in circuit 56, and since the amplifier is tuned to a frequency equal to the r.p.m. of the motor, unwanted frequencies are eliminated, including that of the 60-cycle source. The signal leaving amplifier 56 is a 20 c.p.s. sine wave (FIGURE 7), the amplitude of which is proportional to the difference in intensities of the argon and nitrogen beams. Since the amplifier 56 discards everything except the 20 c.p.s. component, it is clear that when the two beams are equal in intensity, there will be no 20 c.p.s. component (amplitude=0) and hence, no signal from amplifier 56. A 20 c.p.s. signal is thus an indication of a difference in argon and nitrogen beam intensities and is used to produce the proper degree of adjustment of attenuator 52 needed to again equalize the beam intensities. The adjustment of the attenuator is accomplished by means of servomechanism motor 58.

The signal from amplifier 56 must also cause the proper direction of adjustment of the attenuator; i.e., toward greater or lesser intensity of the controlled beam. For this purpose, a 20 c.p.s. reference signal is generated at 60 by the mirror motor and is compared with the 20 c.p.s. signal from amplifier 56 in a phase detector 62. If the two signals are in phase, a D.C. signal of a certain polarity (e.g., positive) is generated by the phase detector. If the signals are 180° out of phase, a D.C. signal of the opposite polarity is generated (see FIGURE 8). It is this D.C. signal which controls the attenuator motor, and causes an adjustment to be made. The polarity of the signal determines the direction of adjustment of the attenuator.

The optical attenuator may be two polarized disks as indicated in FIGURE 5, item 52. Alternately, it may consist of polarizing prisms (Rochon, Nicol, Glan-Foucault, or Glan-Thompson), optical absorption or reflection wedges, or opaque combs. Any means allowing convenient electrical or mechanical control may be used provided it is reasonably transparent to the desired wavelengths. Although the attenuator may be interposed in either beam, we prefer to control the intensity of the argon, or reference beam.

The adjustment of the attenuator is accompanied by a corresponding adjustment of the pen of an instrument 64 which records the content of nitrogen. With some types of optical attenuators, a change in beam intensities will be linearly related to the movement of the adjusting element, and in such cases, it will be convenient to provide a direct linkage between the servomechanism and the recorder. With other types, for example, polarizing prisms, the change in intensity is proportional to some trigonometric function of the angle of adjustment, e.g., $\cos^2$. If desired, the trigonometric function may be converted to a linear function; and this in the purpose of the function converter 66. The function conversion step, if needed, may be performed by apparatus available on the market of either electrical or mechanical nature. In some instances, it can be obtained as an integral feature of recorder 64.

The analyzer of FIGURE 5 operates to maintain equal intensities of the beams entering the phototube. A change in nitrogen concentration produces a difference in the beam intensities, and this in turn produces an electric signal to the servomechanism motor. The servomechanism responds by readjusting the beam intensities until they are again equal and by repositioning the recorder pen to indicate the new concentration.

The important advantage, which may be gained with the second embodiment is that the use of a single phototube and a single amplifying sysem eliminates errors due to changes in the characteristics of the phototubes and of the amplifier tubes. Thus, the characteristics of these components may change appreciably with time without greatly affecting the accuracy of the instrument. The alternating electric voltage developed at phototube 44 is only an "error" signal, and proper operation does not depend on accurate linear amplification and measurement of this signal. Thus, the use of an "optical null balance" principle eliminates the need for frequent calibration of the electrical circuits in the instrument.

FIGURE 9 shows a simplified embodiment of the invention which has been found very effective for measurements or spot checks where absolute accuracy is not necessary and where it is not convenient to carry the bulkier equipment necessary with the embodiments shown in FIGURES 1 and 5. In this form the argon and nitrogen gas mixture to be tested is raised to an emissive energy level in the silent electric discharge tube 10 and the radiation therefrom is passed through a filter 37 or grating which only allows the preselected nitrogen band to pass. This component band falls on the phototube 32 which generates a voltage proportional to the intensity of the beam, said voltage being readable on the voltmeter. While this embodiment is not as accurate as the others, it works quite well for spot checks in plant processes, the primary disadvantage being that the instrument needs to be calibrated periodically to compensate for such variables as phototube sensitivity, amplifier sensitivity, if used, and so forth.

It should be reiterated that the development of the present invention which renders a continuous, quantitative analysis of nitrogen in argon was accomplished only after long and diligent research and experimentation. Other known measuring systems were studied before emission spectrometry was considered and chosen as the preferred approach. As stated previously, certain systems for raising the argon-nitrogen gas mixture to an emissive energy level either resulted in partial absorption of the nitrogen, thus rendering the results inaccurate, the production of characteristic spectrum lines whose intensity was not proportional to the amount of nitrogen contaminant, or the use of equipment whose expense rendered the instrument impractical ab initio. The discovery of the silent electric discharge tube as the energizer for a spectrometric analysis has resulted in an instrument which is relatively inexpensive, accurate, adaptable for continuous measurements, and furthermore, usable at atmospheric pressures. It thus meets a pressing need in the industry for a reliable control instrument for the commercial production of argon wherein nitrogen impurities have to be maintained within certain limits.

In the foregoing description, the numerical values given are illustrative and should not be construed as limiting the scope of this invention.

Having thus described the invention, what we desire to obtain by Letters Patent is:

1. A method for the quantitative determination of nitrogen in argon in ranges up to 1 percent by volume of nitrogen which comprises the steps of exciting the nitrogen-argon mixture to be analyzed to a radiation emissive energy level in a silent electric discharge, separating a selected nitrogen radiation band from the spectrum produced, and measuring the intensity of said selected band to indicate the percent of nitrogen present in the mixture.

2. The method of claim 1 in which the excitation occurs at substantially atmospheric pressure.

3. The method of claim 1 wherein the pressure of the gas mixture during the excitation step is substantially atmospheric and wherein there is a substantially continuous gas flow through the excitation source whereby a continuous analysis is made.

4. The method of claim 1 wherein the selected radiation characteristic is in the near ultra-violet range.

5. A method for measuring nitrogen contamination in argon which comprises exciting a sample of the binary gas to a radiation emissive energy level in a silent electric discharge tube, collecting the composite emitted radiation, separating from the composite two principal radiation lines characteristic of each gas present, converting the said two characteristic radiation lines into electrical signals having magnitudes proportional to the intensity of the respective radiation spectra, comparing the electrical signals so derived to obtain a resultant signal indicative of the amount of nitrogen present in the sample, and driving an indicating device with said resultant signal.

6. The method as set forth in claim 5 above including the additional step of recording the reading of the indicating device.

7. In an emission spectrometer, means including a silent electric discharge tube for raising the energy level of a gas sample to be analyzed so that the sought component emits a major radiation line characteristic of that component, optical means interposed in the path of the composite radiation for separating a major radiation line characteristic of the sought component, means for converting the emission spectra into an electric signal, and means for measuring said electrical signal as an indication of the quantities of the sought component gas present in the sample.

8. In an emission spectrometer for detecting trace amounts of nitrogen in argon, an excitation chamber wherein a gas sample is raised to a radiation emissive energy level by a silent electric discharge, optical means for receiving the emitted light beam and separating out a radiation characteristic of a component gas of the sample and a reference radiation, photoelectric means for converting the radiations into proportional electric impulses, amplifying and filtering means to convert these impulses into measurable signals, means for comparing the respective signals to derive therefrom a signal of a polarity and amplitude indicative of the difference between the beam intensities.

9. In an emission spectrometer for determining nitrogen contamination of argon, silent electric discharge means for exciting the binary gas sample to its light emissive energy level, optical means for collecting the composite emitted beams from the ionized sample and for separating the composite into its two principal characteristic spectra, photoelectric means for converting the respective characteristic beams into electrical impulses, means for amplifying and filtering these impulses into measurable electrical potentials proportional to the emission of the respective constituents of the gas sample, means for measuring these signals and deriving a resultant signal having a magnitude proportional to the relative beam intensities, and means for recording this latter signal.

10. In an emission spectrometer for measuring the nitrogen contamination of argon, means including a silent electric discharge tube for raising the gas sample to an emissive energy level whereby a radiation characteristic of each component is emitted, means for isolating the radiation characteristic of the nitrogen component, means for converting said nitrogen radiation characteristic into an electrical signal of a magnitude that is proportional to the intensity of the radiation, and means for indicating the magnitude of said electrical signal.

11. An emission spectrometer as set forth in claim 10 above, wherein said means for converting the nitrogen radiation characteristic into an electrical signal comprises a phototube and an amplifier.

12. In an emission spectrometer for detecting trace amounts of nitrogen in argon, an excitation chamber wherein the binary gas sample is raised to a radiation emissive energy level, said chamber having a silent electric discharge tube, optical means for receiving composite radiation from the excitation chamber and separating a major radiation line characteristic of each gas present in the sample, phototube and amplifier means for converting each of the radiation characteristics into proportional electrical signals, and a means for receiving the two electrical signals and adjusting a potentiometer in accordance with the ratio of the magnitude of the nitrogen signal with respect to the argon signal, the position of the potentiometer being a direct indication of the percentage of nitrogen present in the gas sample.

13. The apparatus as set forth in claim 12 above wherein means is provided for isolating the indication from the power supply frequency interference which includes a light "chopper" in the composite optical signal path and an electrical filter in each amplifier tuned to the frequency of interruption of said "chopper."

14. An emission spectrometer which comprises a silent electric discharge chamber for raising a gas sample to an emissive energy level, optical means for receiving composite radiation from said chamber, beam splitter means for directing said radiation along two different paths, filter means in at least one of said paths for separating a major radiation line characteristic of at least one gas present in the sample, adjustable optical attenuation means in one of said paths, optical means for directing alternately radiation from each path on a single photo-cell means, which produces a pulsating direct current signal the magnitude of alternate portions of which are proportional to the instantaneous intensities of the alternately received radiations amplifier means for detecting a difference in the magnitude of said alternate portions of said direct current signal and producing a corrective signal proportional to said difference, servo-mechanism means responsive to said amplifier output signal for varying the adjustable optical attenuation to equalize the respective radiation intensity in each said path, and indicator means also responsive to said servo-mechanism means for indicating the intensity of said major radiation line.

References Cited in the file of this patent
UNITED STATES PATENTS

| | | |
|---|---|---|
| 2,698,390 | Liston | Dec. 28, 1954 |
| 2,744,438 | Steinhaus et al. | May 8, 1956 |
| 2,753,479 | Aughey et al. | July 3, 1956 |
| 2,831,118 | Sparks et al. | Apr. 15, 1958 |
| 2,847,578 | Staten | Aug. 12, 1958 |
| 2,872,588 | Barton | Feb. 3, 1959 |